(12) United States Patent
Hashem et al.

(10) Patent No.: US 7,061,898 B2
(45) Date of Patent: Jun. 13, 2006

(54) SYSTEM AND METHOD FOR TIME SLOTTED CODE DIVISION MULTIPLE ACCESS COMMUNICATION IN A WIRELESS COMMUNICATION ENVIRONMENT

(75) Inventors: Bassam M. Hashem, Nepean (CA); Eman A. Fituri, Nepean (CA); Mark Earnshaw, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 941 days.

(21) Appl. No.: 10/013,562

(22) Filed: Dec. 11, 2001

(65) Prior Publication Data

US 2002/0122403 A1 Sep. 5, 2002

Related U.S. Application Data

(63) Continuation-in-part of application No. 09/797,273, filed on Mar. 1, 2001, now Pat. No. 6,930,470.

(51) Int. Cl.
H04B 7/216 (2006.01)

(52) U.S. Cl. .................. 370/342; 370/348; 455/403
(58) Field of Classification Search ................ 370/337, 370/335, 468, 342, 348, 461, 336, 329, 330, 370/465, 321, 333, 320; 455/436, 437
See application file for complete search history.

(56) References Cited

U.S. PATENT DOCUMENTS

| | | | |
|---|---|---|---|
| 5,396,645 A | 3/1995 | Huff | |
| 5,787,348 A | 7/1998 | Willey et al. | |
| 6,246,673 B1 * | 6/2001 | Tiedemann et al. | 370/333 |
| 6,631,124 B1 * | 10/2003 | Koorapaty et al. | 370/337 |
| 6,907,243 B1 * | 6/2005 | Patel | 455/442 |

FOREIGN PATENT DOCUMENTS

| | | |
|---|---|---|
| DE | 197 41 701 A1 | 3/1999 |
| EP | 0 946 072 A1 | 9/1999 |

(Continued)

OTHER PUBLICATIONS

Povey, G.J.R.: "Frequency and Time Division Duplex Techniques for CDMA Cellular Radio", Spread Spectrum Techniques and Applications, 1994. IEEE ISSSTA '94., IEEE Third International Symposium on Oulu, Finland Jul. 4-6, 1994, New York, NY, USA, IEEE, Jul. 4, 1994, pp. 309-313, XP010129669.

(Continued)

Primary Examiner—Chi H. Pham
Assistant Examiner—Alexander O. Boakye
(74) Attorney, Agent, or Firm—Christopher & Weisberg, P.A.

(57) ABSTRACT

A method and apparatus for assigning a time slotted code division multiple access carrier for wireless reverse link communication between a device and a base station. One or more performance characteristics corresponding to the device are determined. A code division multiple access spreading code is assigned based on the determined performance characteristics. A time slot for communication with the base station is assigned based on the assigned spreading code. According to one aspect, the assigned spreading code corresponds to one of an SCDMA code and an ACDMA code such that a time slot corresponding to an SCDMA code provides a time slot in which all devices are preferably in time-aligned orthogonal communication with the base station. An increase in channel gain and an increase in channel capacity result as compared with a system where time slots support mixed ACDMA and SCDMA codes.

17 Claims, 7 Drawing Sheets

FOREIGN PATENT DOCUMENTS

| EP | 1 059 818 A2 | | 12/2000 |
|---|---|---|---|
| EP | 1 059 818 A3 | | 2/2002 |
| WO | WO/97/34421 | * | 9/1997 |
| WO | WO 00/38466 A | | 6/2000 |
| WO | WO 01/33742 A1 | | 5/2001 |

OTHER PUBLICATIONS

Sunay, M.O., et al.: "A Dynamic Channel Allocation Based TDD DS CDMA Residential Indoor System", 1997 IEEE 6th. International Conference on Universal Personal Communications Record. San Diego, Oct. 12-16., 1997, IEEE International Conference on Universal Personal Communicatons, New York, IEEE, USA, vol. 2 Conf. 6, Oct. 12, 1997, pp. 228-234 XP010248703.

Hass, H., et al.: "Outage Probability of CDMA-FDD Micro Cells in a CDMA-FDD Environment", Personal, Indoor and Mobile Radio Communications, 1998. The Ninth IEEE International Symposium on Boston, MA, USA Sep. 8-11, 1998, New York, NY, US, IEEE, USA. Sep. 8, 1998, pp. 94-98, XP010314770.

Chenhong Huang: "An Analysis of CDMA 3G Wireless Communications Standards", Vehicular Technology Conference, 1999 IEEE 49th Houston, TX, USA May 16-20, 1999, Piscataway, NJ, USA IEEE, USA, May 16, 1999, pp. 342-345, XP010341901.

Een-Kee Hong et al., "*Synchronous Transmission Technique for the Reverse Link in DS-CDMA Terrestrial Mobile Systems,*" IEEE Transactions on Communications, Nov., 1999, 4 pages (pp. 1632-1635).

Ramjee Prasad and Tero Ojanperä, "*An Overview of CDMA Evolution Toward Wideband CDMA,*" IEEE Communications Surveys, Fourth Quarter 1998, 28 pages (pp. 2-29).

"Code Selection," http://cas.et.tudelft.nl/~glas/thesis/node28html, 8 pages, downloaded Oct. 18, 2000.

"The Principles of Spread Spectrum Communication," http://cas.et.tudelft.nl~glas/ssc/techn/techniques.html. 7 pages, downloaded Oct. 18, 2000.

Brian O'Shaughnessy, "*The Move to CDMA: Bell Mobility's Technology Decision,*" http://www.cdg.org/features/GuestCol/oshaughnessy.html. 4 pages, downloaded Sep. 18, 2000.

"*About CDMA Technology. Standards,*" http://www.cdg.org/tech/$a_{13}$ ross/Standards.html. 2 pages, downloaded Sep. 18, 2000.

*S-CDMA, Synchronous Code Division Multiple Access*, http://register.cnet.com/Resources/Info/Glossary/Terms/scdma.html, 1 page, downloaded Sep. 18, 2000.

"CDMA Explained," http://www.cdma.com/cda/tech/3g/overview/0.1751..00.html. 2 pages, downloaded Sep. 18, 2000.

"About CDMA," http://www.cdma.com/cda/tech/aboutcdma/0.1704.3.00.html. 3 pages, downloaded Sep. 18, 2000.

"*About CDMA Digital Phones,*" http://www.kyocera-wireless.com/cdma/cdma-advantages.html, 2 pages, downloaded Sep. 18, 2000.

"*About CDMA Digital Phones,*" http://www.kyocera-wireless.com/cdma/qa.html. 2 pages, downloaded Sep. 18, 2000.

"CDMA Technology, What is CDMA (Code Division Multiple Access)?," http://www.cdg.org/tech/tech.html. 2 pages, downloaded Sep. 18, 2000.

"CDMA Terminology and Definitions," http://www.cdg.org/tech/cdma_term.html. 1 page, downloaded Sep. 18, 2000.

"What is CDMA (Code Division Multiple Access)?," http://www.cdg.org/tech/about_cdma.html. 3 pages, downloaded Sep. 18, 2000.

"*About CDMA Technology, Principles of CDMA,*" http://www.cdg.org/tech/a_ross/Principles.html. 2 pages, downloaded Sep. 18, 2000.

"*About CDMA Technology, Introdocution to CDMA,*" http://www.cdg.org/tech/a_ross/Intro.html, 2 pages, downloaded Sep. 18, 2000.

"*About CDMA Technology, The CDMA Revolution,*" http://www.cdg.org/tech/a_ross/CDMARevolution.html, 6 pages, downloaded Sep. 18, 2000.

"*About CDMA Technology, Frequency Plans,*" http://www.cdg.org/tech/a_ross/FreqPlan.html, 2 pages, downloaded Sep. 18, 2000.

"*About CDMA Technology, Commercialization of CDMA,*" http://www.cdg.org/tech/a_ross/Commercial.html, 1 page, downloaded Sep. 18, 2000.

"*About CDMA Technology, Spreading Bandwidth,*" http://www.cdg.org/techa_ross/SpreadingBW.html, 1 page. downloaded Sep. 18, 2000.

"*About CDMA Technology, Spreading Codes,*" http://www.cdg.org/techa_ross/Spreading.html, 1 page, downloaded Sep. 18, 2000.

"*About CDMA Technology, Handoff,*" http://www.cdg.org/techa_ross/Handoff.html, 4 pages, downloaded Sep. 18, 2000.

"*About CDMA Technology, Power Control,*" http://www.cdg.org/tech/a_ross/PowerControl.html, 3 pages. downloaded Sep. 18, 2000.

"*About CDMA Technology, Forward CDMA Channel,*" http://www.cdg.org/tech/a_ross/Forward,html, 4 pages, downloaded Sep. 18, 2000.

"*About CDMA Technology, Multiple Access Wireless Communications,*" http://www.cdg.org/tech/a_ross/MultipleAccess.html, 3 pages, downloaded Sep. 18, 2000.

*About CDMA Technology, Reverse CDMA Channel*, http://www.cdg.org/tech/a_ross/Reverse/html, 4 pages, downloaded Sep. 18, 2000.

"*About CDMA Technology, CDMA Glossary A-F,*" http://www.cdg.org/tech/a_ross/DefAtoF.html, 7 pages, downloaded Sep. 18, 2000.

"*About CDMA Technology, CDMA Glossary G-M,*" http://www.cdg.org/tech/a_ross/DefGtoM.html, 4 pages, downloaded Sep. 18, 2000.

"*About CDMA Technology, CDMA Glossary N-S,*" http://www.cdg.org/tech/a_ross/DefNtoS.html, 5 pages, downloaded Sep. 18, 2000.

"*About CDMA Technology, CDMA Glossary T-Z,*" http://www.cdg.org/tech/a_ross/DefTtoZ.html, 2 pages, downloaded Sep. 18, 2000.

"*Method and Principle of Uplink Synchronization,*" TSG-RAN Working Group 1 (Radio) meeting #5, 6 pages, Jun. 1999.

"*Overview of Uplink Synchronous Transmissiom Scheme (USTS),*" TSG-RAN Working Group 2 meeting #15, 5 pages, Aug., 2000.

"*Feasibility study on USTS,*" TSG-RAN Working Group 1 meeting #16, 6 pages, Oct. 2000.

"*Guideline for Evaluation of Radio Transmission Technologies for IMT-2000,*" Recommendation ITU-R M. 1225, (Question ITU-R 39/8), 1997.

\* cited by examiner

SYSTEM AND METHOD FOR TIME SLOTTED CODE DIVISION MULTIPLE ACCESS COMMUNICATION IN A WIRELESS COMMUNICATION ENVIRONMENT

CROSS-REFERENCE TO RELATED APPLICATION

This application is a continuation-in-part of U.S. patent application Ser. No. 09/797,273, filed Mar. 1, 2001 now U.S. Pat. No. 6,930,470, entitled SYSTEM AND METHOD FOR CODE DIVISION MULTIPLE ACCESS COMMUNICATION IN A WIRELESS COMMUNICATION ENVIRONMENT, the entire contents of which are incorporated herein by reference.

STATEMENT REGARDING FEDERALLY SPONSORED RESEARCH OR DEVELOPMENT n/a

FIELD OF THE INVENTION

The present invention relates to a system and method for wireless communication for a reverse communication link (wireless device to base station), and in particular, to a system and method for wireless communication in code division multiple access (CDMA) environment which assigns communication time slots and spreading codes for asynchronous operation and synchronous operation based on one or more performance characteristics.

BACKGROUND OF THE INVENTION

The success of wireless communications has increased demand for new types of wireless devices as well as for an increase in quantity of these devices. While wireless devices suitable for communication via cell-based systems such as code division multiple access (CDMA) and orthogonal frequency division multiplexed (OFDM) systems were traditionally relegated to telephones, such is no longer the case.

Rather, wireless communication devices also include personal digital assistants (PDAs), pagers, network appliances, laptop and desktop computers, etc. These devices and their users can be divided into three categories, namely, mobile, nomadic and stationary. Mobile devices refer to devices which are moving during use, such as telephones and personal digital assistants when used while walking, riding in a vehicle, and the like. Stationary devices refer to devices which are typically not prone to movement, even during repeated use. An example of a stationary device is a personal tower computer equipped with wireless communication capability. Nomadic devices refer to devices which can move from place to place but are typically stationary during use. Although typically stationary during use, a nomadic device can also be mobile during use. An example of a nomadic device is a laptop computer equipped with wireless communication capability in which the laptop computer is used in an office and moved to another location for subsequent use. According to this example, the laptop computer can be used while being moved, such as while riding in a train or car.

Current wireless communication infrastructures also include one or more base stations, used to communicate with the wireless devices, arranged in a network with access being provided to external services, for example, Internet access. Demand is such that the infrastructure exists in the form of increasing base station and antenna densities, as well as increasing processing loads placed on base station communication equipment as devices are added to the system.

Current and proposed wireless communication environments such as the Third Generation Partnership Project (3GPP) propose different designs for the different categories of devices described above. The device category becomes particularly important when determining the designs for the reverse link (device to base station). In particular, CDMA environments such as the 3GPP propose two types of reverse link designs, namely, synchronous code division multiple access (SCDMA) and asynchronous code division multiple access (ACDMA) with devices operating on one or the other type of link. However, the 3GPP does not address the complementary use of SCDMA codes and ACDMA codes on the reverse link. Further, neither the 3GPP nor the CDMA2000 communication environment address the complementary use of SCDMA codes and ACMDA codes based on the type of device, i.e. stationary or mobile.

SCDMA refers to synchronous orthogonal transmission in which each communication channel is identified by a different orthogonal spreading sequence, and synchronization among channels is achieved by ensuring that transmissions arrive at each receiver at substantially the same time. In contrast, an ACDMA link is a link in which transmissions arrive at the receivers at different times. ACDMA links result in a loss in the orthogonality of the system and an increase in interference within each base station's coverage area, i.e. cell, as compared with a SCDMA link.

As a result of the orthogonality of SCDMA transmission, an orthogonality gain on the order of 3 dB or more with respect to the carrier to interference ratio required to achieve a given bit error rate (BER) over an equivalent ACDMA link is realized. The SCDMA arrangement is desirable over ACDMA operation because the capacity of the carrier channel is therefore increased when all devices are operating synchronously. However, the presence of devices operating out of time alignment, i.e. asynchronously with the other devices, increases interference in the channel, thereby decreasing capacity and performance in the channel. As discussed above, SCDMA links require time alignment among the receivers and also require the use of orthogonal-spreading codes such as Walsh-spreading codes. Because the number of codes in an orthogonal-spreading code environment are limited as compared with non-orthogonal codes such as those used in ACDMA links, the number of devices which can simultaneously be used with a particular carrier within a cell are limited. This limitation makes the code assignment aspect particularly important and therefore increases system complexity.

An integral feature of CDMA systems is the concept of soft handover. Soft handover refers to the simultaneous communication between a wireless device and multiple base stations such that communication is transferred from one base station to another in a make-before-break fashion, i.e., communication is established with the new base station prior to breaking the communication link with the current base station. A device using an SCDMA code can maintain soft handoff with other base stations, however, these other base stations see the SCDMA code as an ordinary pseudo-noise code. Therefore, devices in soft handoff increase the amount of interference experienced by the SCDMA devices within the cell. Because accurate time alignment, e.g. within one-eighth or one-quarter of a chip, is required in a high-capacity SCDMA system, devices in the mobile category described above have difficulty maintaining synchronous operation on the reverse link due to device movement with respect to other devices and the base station. Furthermore, the ability to maintain synchronization is also impacted by the variability in fading and interference, even for stationary uses. This adverse effect is particularly prevalent in wide-band (i.e. 5 MHz and up) systems due to the very fast chip rates involved. As a result, systems such as those conforming to 3GPP standards propose separate designs for low and high mobility devices.

The category in which a device operates may change, for example, when a mobile device user stops moving for a prolonged period. Current systems do not, however, support the switch between one category and another, i.e., ACDMA to/from SCDMA reverse link operation. As such, a mobile device which becomes stationary may be relegated to less efficient and lower capacity asynchronous operation when, in fact, the device could make efficient use of an SCDMA reverse link. Similarly, a nomadic device which changes from stationary to mobile operation may adversely impact the performance of an originally assigned SCDMA reverse link due to its imposition of increased channel interference due to the inability to maintain orthogonality.

It is therefore desirable to have a wireless communication system which allows a device to operate in an SCDMA reverse link mode or an ACDMA reverse link mode depending on the particular profile of the wireless device during operation.

Further, because current wireless communication systems do not facilitate switching from ACDMA to SCDMA operation and vice-versa during a communication session, these current systems do not monitor the operational mode of the device to detect operational category changes of the device, e.g. the ability of the device to maintain synchronization (degree of unit mobility). Also, current systems are not optimized for situations which restrict the use of an SCDMA code.

It is therefore desirable to have a system which monitors the operational characteristics, i.e. category of operation, of the devices to detect a change therein. This is particularly the case in multi-carrier wide-band operation in which a system provider allocates their wide-band frequency spectrum into multiple discrete carriers such that each carrier supports a particular type of operation, for example SCDMA or ACDMA.

It is also desirable to have a CDMA system which reduces interference to devices operating in an SCDMA mode while offering the use of unlimited ACDMA codes for mobile users to ensure optimal system operation.

Use of a plurality of discrete frequency division multiplexed (FDM) carriers as described in U.S. patent application Ser. No. 09/797,273 allows separate carriers to support ADCMA and SCDMA codes, but is not as efficient as using a single large bandwidth carrier to support both code types due to the bandwidth wasted as a result of the need to provide a guard band between each separate carrier. It is therefore further desirable to have a method of supporting SCDMA codes and ADCMA codes in a communication environment which uses a single large bandwidth carrier as opposed to a plurality of smaller carriers.

The additional capacity gains in SCDMA relative to ADCMA access are obtained at the expense of code limitations. As such, the number of wireless devices which can access a base station at any one time are severely limited in the case of SCDMA access. It is therefore desirable to have a system and method which provides a way to reuse spreading codes within a cell (as used herein, "cell" refers to the communication area supported by a base station).

Although theoretically optimal, not all wireless devices communicating with a base station will be orthogonal with respect to one another. This is due to a number of factors. First, channel conditions and/or velocity of the wireless device may inhibit accurate time alignment at the base station. Second, some users in a CDMA system will be in soft handoff. As a result, the wireless device signal arrival time can be time aligned with no more than one base station. Third, because there are a limited number of orthogonal spreading codes available at each base station, wireless devices communicating with the same base station may begin to reuse these codes after scrambling them differently. As such, the codes will appear as pseudonoise codes to other wireless devices. The result is that the transmission of some of the wireless devices will be orthogonal to each other and some will not. Of course, the greater the number of wireless devices transmitting orthogonally with each other, the greater the capacity of the channel.

It is desirable therefore, to have a system and method which can optimize wireless communication channels by grouping the transmission from wireless devices which are transmitting orthogonally to each other.

Many wireless systems include radio resource managers ("RRMs"), also known as schedulers. Among other functions, RRMs operate to manage the wireless communication channels for a base station or group of base stations by assigning time slots, frequencies and spreading codes to the wireless devices associated with the base station(s). These assignments are typically based on channel conditions such as channel quality (C/I ratio), but can also be assigned based on quality of service requirements, wireless device communication priority and/or a round robin assignment scheme.

As used herein, a time slot represents the unit of time which serves to divide the sharing of transmission resources in the time domain. Typically, such time slots are quite short, for example, on the order of one millisecond. A device may be granted transmission resources for one or more consecutive time slots. After this time period has passed, another device may be granted the same transmission resources. However, the transmissions from the two devices are separated in time because they are transmitting in separate time slots. As such the devices do not interfere with each other.

However, current RRMs do not include support for tracking whether time slots are allocated to spreading codes for ACDMA or SCDMA communication. Known RRMs also cannot group wireless devices into those using/requiring ADCMA communication, i.e. wireless devices not in orthogonal communication with other wireless devices and those wireless devices using/requiring SCDMA communication, i.e. wireless devices in orthogonal communication with other wireless devices, in order to facilitate time slot assignment which maximizes channel capacity. The result is that time slots associated with a particular channel are assigned in a non-optimal fashion, thereby leading to inefficient use of the channel and a reduction in channel and system capacity.

It is therefore also desirable to have a CDMA system in which RRMs can track whether time slots correspond to SCDMA codes or ACDMA codes and group wireless devices in a manner such that devices operating in a mode which require an ACDMA code are grouped together for purposes of time slot assignment and devices operating in a mode which can use an SCDMA code are grouped together for purposes of time slot assignment, thereby maximizing the efficiency of the channel and system. It is further desirable to have a method and system which allows the limited spreading codes corresponding to SCDMA communication with a base station within a cell to be reused in a manner which preserves communication orthogonality between large groups of wireless devices.

SUMMARY OF THE INVENTION

The present invention advantageously provides radio resource manager functions which expand the number of orthogonal codes available within a cell by allowing code reuse and by assigning time slots to groups of devices which can benefit from the use of SCDMA codes.

A method provided by the present invention advantageously allows the use of a single large bandwidth carrier to support ACDMA and SCDMA codes, thereby avoiding the need to support multiple carriers with guard bands there between.

According to one aspect, the present invention provides a method of assigning a time slot for wireless communication between a device and a base station in which one or more performance characteristics corresponding to the device are determined. A spreading code based on the determined performance characteristics is assigned. A time slot for communication with the base station is assigned based on the assigned spreading code.

According to another aspect, the present invention provides an apparatus for assigning a time slot for wireless communication between a device and a base station, in which the apparatus has a central processing unit. The central processing unit operates to determine one or more performance characteristics corresponding to the device, assign a spreading code based on the determined performance characteristics and assign a time slot for communication with the base station based on the assigned spreading code.

As still another aspect, the present invention provides a communication signal embodied in a wireless communication medium between a device and a base station. The wireless signal has a plurality of time slots in which each of the plurality of time slots supports communication from the device to the base station using one of synchronous code division multiple access codes and asynchronous code division multiple access codes.

According to yet another aspect, the present invention provides a method of selecting spreading code sets associated with code division multiple access wireless communication between a device and a base station in which a scrambling code is selected from a plurality of scrambling codes corresponding to the base station. A code division multiple access spreading code set is selected from a plurality of code division multiple access spreading code sets corresponding to the base station such that a first combination of a first spreading code set with a scrambling code yields total codes which are orthogonal to a second combination of a second spreading code set with the scrambling code.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
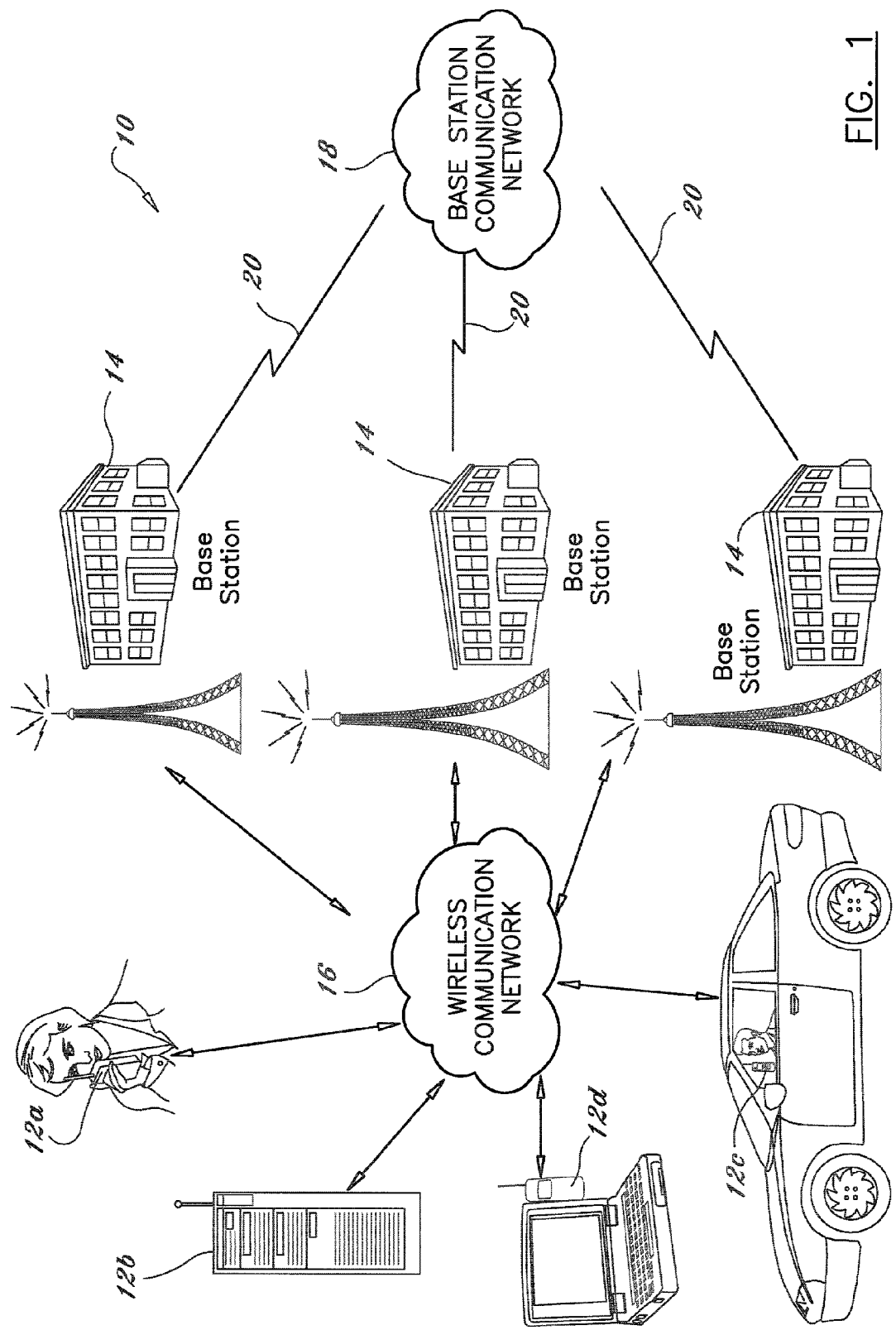
FIG. 1 is a block diagram of a communication system constructed in accordance with the principles of the present invention.

Referring now to the drawing figures in which like reference designators refer to like elements, there is shown in FIG. 1 a communication system constructed in accordance with the principles of the present invention and designated generally as 10. Communication system 10 preferably includes one or more wireless devices 12 (shown as handheld wireless device 12a, wireless tower computer 12b, wireless vehicular mounted phone 12c, and wireless laptop computer 12d) in communication with one or more base stations 14 via wireless communication network 16. Devices 12 and base stations 14 are commonly referred to together herein as "units".

Handheld wireless device 12a is an example of a mobile device, wireless tower 12b is an example of a stationary device, vehicular mounted wireless phone 12c is an example of a mobile device, and wireless laptop computer 12d is an example of a nomadic device. Of course, handheld wireless device 12a and vehicular mounted wireless phone 12c may also be considered nomadic devices because they are operable when the user (or vehicle) is stationary as well as when the user (or vehicle) is moving. However, devices 12a and 12c are considered mobile as discussed herein, because these devices are typically in motion when being used. Communication system 10 is also comprised of base station communication network 18 coupled to base stations 14 via communication links 20. Communication links 20 and communication network 18 can undertake any arrangement used to facilitate communication between base stations 14 themselves and/or external services such as Internet access, news and stock quotation services and the like (not shown). Arrangements for communication network 18 and communication links 20 such as those used to support digital wireless networks are known. For example, communication links 20 can be wireless or wired links such as multi-megabit per second links. Communication network 18 is comprised of digital switches, routers and other known digital communication devices.

Devices 12 are any wireless communication devices, and are not limited solely to the four types of devices shown in FIG. 1. Each of devices 12 includes a wireless communication section, described below in detail, which receives and transmits wireless communication signals to and from base stations 14.

Figure 2:
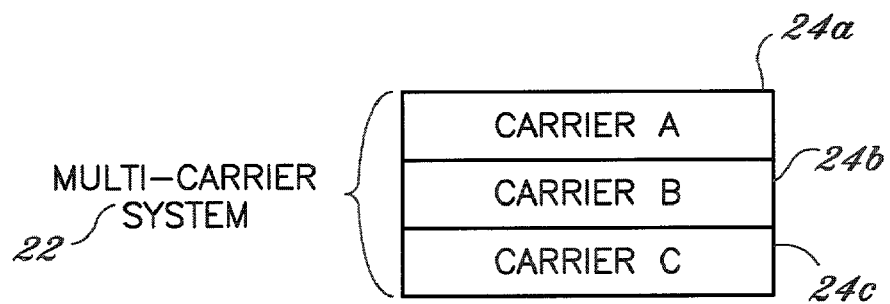
FIG. 2 is a diagram of an arrangement of a multi-carrier system constructed in accordance with the principles of the present invention.

Wireless communication network 16 is preferably a wideband system. As used herein, the term "wideband" refers to systems having a minimum of a 5 MHz bandwidth. The wideband system is preferably arranged as a multi-carrier system in which wireless communication links between devices 12 and/or base stations 14 are established using one of the carriers in the multi-carrier system. FIG. 2 shows a diagram of an arrangement of a multi-carrier system for reverse links constructed in accordance with the principles of the present invention. As shown in FIG. 2, multi-carrier system 22 is comprised of a plurality of carriers, namely, carrier A 24a, carrier B 24b and carrier C 24c. Although FIG. 2 shows adjacent carriers, the present invention is not limited to such.

For example, multi-carrier system 22 can be arranged as a 5 MHz system in which each of carriers A–C (24a, 24b and 24c) are 1.25 MHz carrier channels. As discussed below in detail, individual carriers are used to support particular link arrangements suited to the particular characteristics to the devices using the carrier, for example, ACDMA and SCDMA wireless communication links. As such, and in accordance with the principles of the present invention, carrier A 24a can be used to support an ACDMA reverse link while carrier B 24b can be used to support an SCDMA reverse link.

It is contemplated that wireless communication network 16 can be included as part of any wireless communication system, including a wireless high speed fixed access data system employing a wireless Highspeed Data Protocol (HDP) or a wireless Digital Subscriber Line (DSL) signal. Further, it is contemplated that wireless communication network 16 can be included as part of a wireless local area network. Standardized protocols for providing a wireless high speed data protocol, a wireless DSL signal and a wireless local area network signal are known. As used herein, the term "protocol" refers to the arrangement of data within a data packet, such as packet headers, footers, packet size, etc.

Figure 3:
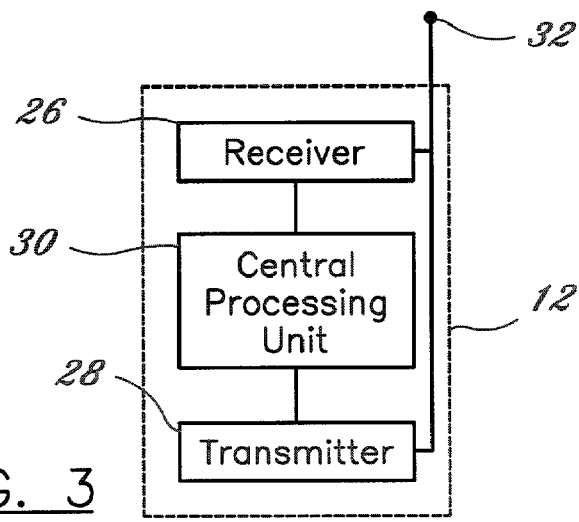
FIG. 3 is a block diagram of the wireless communication section of a device constructed in accordance with the principles of the present invention.

FIG. 3 is a block diagram of the wireless communication portion of a device 12 constructed in accordance with the principles of the present invention. As shown in FIG. 3, the wireless communication portion of device 12 preferably includes a device receiver 26 and a device transmitter 28, each of which are coupled to and controlled by device central processing unit 30. Device receiver 26 and device transmitter 28 are coupled to antenna 32 for respectively receiving and transmitting signals to and from other units.

Device receiver 26 is preferably arranged to receive signals transmitted by base station 14. Device transmitter 28 is preferably arranged to transmit CDMA spread spectrum signals, such as ACDMA and SCDMA spread spectrum signals, to base station 14 via antenna 32. Device central processing unit 30 is any central processing unit capable of executing the device functions described in detail below.

In accordance with the present invention, device central processing unit 30 is preferably arranged to include or have access to sufficient memory (not shown) required to store data, buffer, transmit and receive data and programmatic code to perform its designated, below-described functions. Further, device central processing unit 30 is preferably arranged to cause device 12 to switch between carriers in a multi-carrier system. This is the case regardless of whether device 12 determines that the carrier switch is necessary or whether the carrier switch is executed based on an instruction received from another unit such as base station 14.

Devices 12 are operable to communicate with base station 14 using SCDMA or ACDMA communication on the reverse link, depending upon the operational profile of the device, and are operable to switch between ACDMA and SCDMA communication links using suitable carrier handoff protocols typically used to change carriers in multi-carrier wireless communications.

Figure 4:
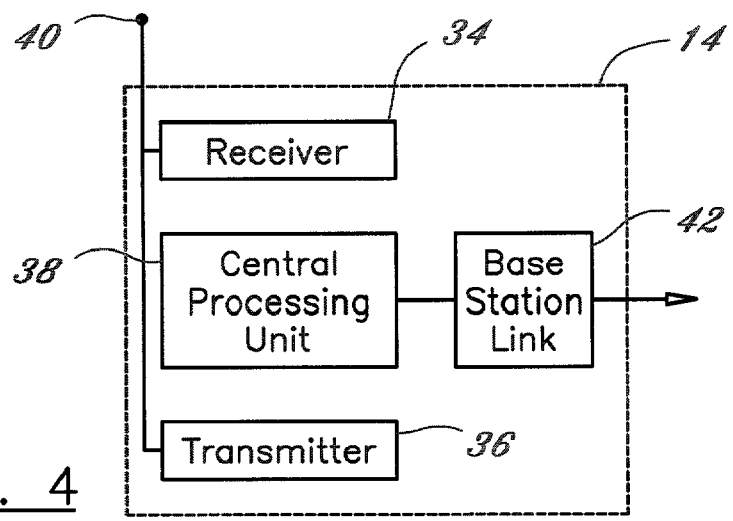
FIG. 4 is a block diagram of the wireless communication section of a base station constructed in accordance with the principles of the present invention.

FIG. 4 is a block diagram of a base station 14 constructed in accordance with the principles of the present invention. As shown in FIG. 4, base station 14 is preferably comprised of base station receiver 34 and base station transmitter 36, each of which are coupled to and controlled by base station central processing unit 38. Base station 14 is also preferably comprised of base station antenna subsystem 40 which is coupled to base station receiver 34 and base station transmitter 36 for receiving signals transmitted by device 12 and transmitting signals to device 12, respectively.

Base station 14 preferably also includes base station link 42 which provides the necessary interface hardware and/or software to couple base station 14 to communication network 18 via communication link 20. This interface hardware takes the form of plugs, jacks and electronic circuit elements. The interface software, when executed, provides the drivers and other functions necessary to receive data from communication network 18 and transmit data to communication network 18.

Base station receiver 34 is preferably arranged to receive wireless spread spectrum CDMA signals, such as ACDMA and SCDMA signals, from a plurality of devices 12. Further, base stations 14 transmit time alignment commands to devices 12 to instruct devices 12 to adjust their transmit timing to maintain synchronous alignment during transmission. Techniques for determining and transmitting time alignment commands in a wireless communication environment are known.

Base station central processing unit 38 preferably includes or has access to a storage unit which contains the programmatic instructions needed to perform the below-described functions. Further, the storage unit is preferably arranged to store data corresponding to in-progress communication with devices 12, provide buffering of data transmitted and/or received to/from devices 12 and communication network 18, and the like. In general, any central processing unit which provides the described functions of base station 14 can be used.

In the case of both device 12 and base station 14, each of the above-described elements of the respective devices are arranged with a communication structure which facilitates communication among the respective elements. Further, it is contemplated that any combination of the elements of each respective device 12 and base station 14, such as the receivers, transmitters and central processing units, can be provided as a single semiconductor integrated circuit.

In accordance with the present invention, each base station 14 is equipped with the ability to communicate with devices 12 using one or a combination of a plurality of carriers in a multi-carrier environment. Further, each base station 14 operates to determine whether to communicate with devices 12 via an ACDMA link or an SCDMA link, in particular the reverse link, based on one or more operational profile characteristics. These characteristics include whether the device is mobile or stationary and whether there are sufficient orthogonal spreading codes available for SCDMA operation.

Figure 5:
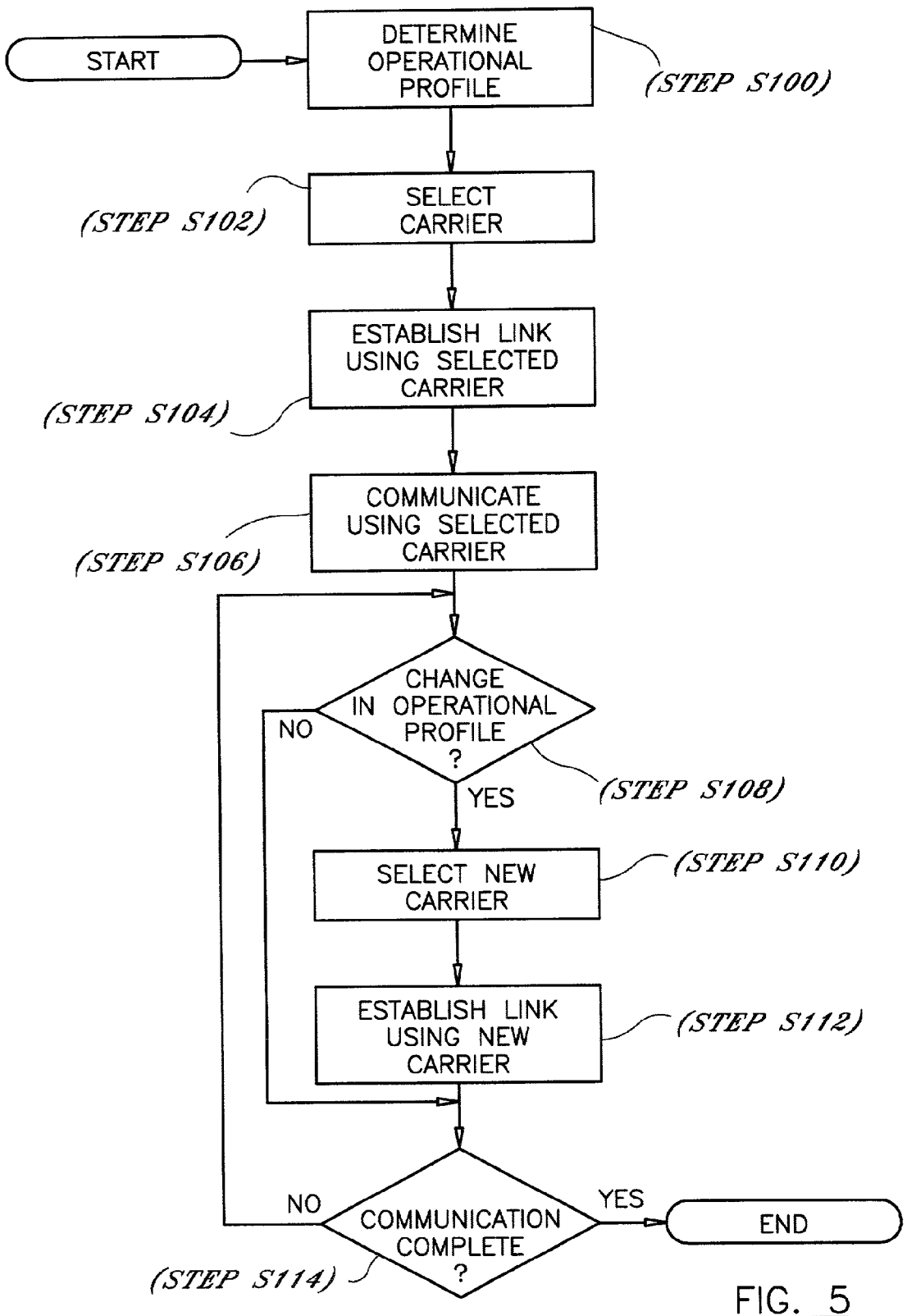
FIG. 5 is a flowchart of the overall operation of the system and the communication units.

The overall operation of system 10 and the communication units is explained with reference to FIG. 5 and is described with reference to communication between a device 12 and a base station 14.

Initially, the operational profile of device 12 is determined (step S100), preferably by base station 14. The operational profile includes a characteristic indicating the degree of mobility of the device. The degree of mobility can take the form of a binary determination, such as stationary or mobile, or the specific degree of mobility can be determined and included as part of the operational profile. Techniques for determining the specific degree of mobility by estimating the velocity of a mobile device 12 based on variations in the timing of the received signal at base station 14 are known. Initially, the access channel or a signaling channel on either an SCDMA carrier or an ACDMA carrier can be used for estimating the velocity. Base stations 14 estimate the degree of mobility of device 12 by tracking the frequency of time alignment changes transmitted to a device 12. As such, the degree of mobility can be set as stationary if mobility is less than a predetermined value, or as mobile if mobility is greater than a predetermined value. The predetermined value is preferably based on the chip rate and the resultant ability of base station 14 to maintain SCDMA links with devices 12.

It is also contemplated that device 12 can determine its own degree of mobility and provide this determination to base station 14. For example, device 12 may be equipped with a tracking system such as a global positioning receiver which determines the change in position of device 12 over time, i.e. velocity.

A carrier for the communication link between device 12 and base station 14 is selected based, at least in part, on the operational profile (step S102). Preferably, a carrier is selected by base station 14 from among carriers in a multi-carrier environment which are dedicated to SCDMA spread spectrum communication links and ACDMA spread spectrum communication links. It is contemplated that device 12 can also select the carrier The carrier selection process is discussed in detail below.

A communication link is established using the selected carrier (step S104) and data communication between device 12 and base station 14 commenced using the selected carrier (step S106). Communication links established as ACDMA communication links proceed using those facilities provided by the system for ACDMA communication. For example, a system supporting mobile devices on a carrier supporting ACDMA communication links may employ "soft handover" techniques between a mobile device 12, such as wireless vehicular mounted phone 12c, and multiple base stations 14.

Data communication continues for the duration of the communication session, i.e., call, data transfer, etc., until the communication session is terminated or a change in the operational profile of device 12 is detected (step S108).

The change in the operational profile of device 12 is detected in a fashion similar to the initial operational profile determined as described with respect to step S100 above. In particular, base stations 14 can determine the degree of mobility of devices 12 and/or devices 12 can determine their own degree of mobility. For example, a nomadic device such as laptop 12d may have established communication based on its initial operational profile reflecting a stationary status. Laptop 12d may begin to move, thereby affecting a change in its operational status from stationary to mobile. Such is the case, for example, when laptop 12d is initially operated on a non-moving train or car which subsequently begins moving. Upon detection of a change in the operational profile (step S108), a potentially new carrier is selected based on the change (step S110). The new carrier is preferably a carrier within the multi-carrier wideband communication environment. As discussed in detail below, a change in the operational profile of a device does not necessarily result in the selection of a new carrier. Such is the case, for example, where there are no available spreading codes in the reverse SCDMA link supported by the new carrier. Although base station 14 preferably selects the new carrier, it is contemplated that the device 12 can select the new carrier and provide the new carrier information to the base station 14

As with step S104, a communication link is established using the new carrier (step S112). Techniques for switching between wireless carrier frequencies without terminating a communication session are known. Monitoring for a change in operational profile for subsequent new carrier selection in steps S108–S112 continues until the communication session is complete (step S114).

Figure 6:
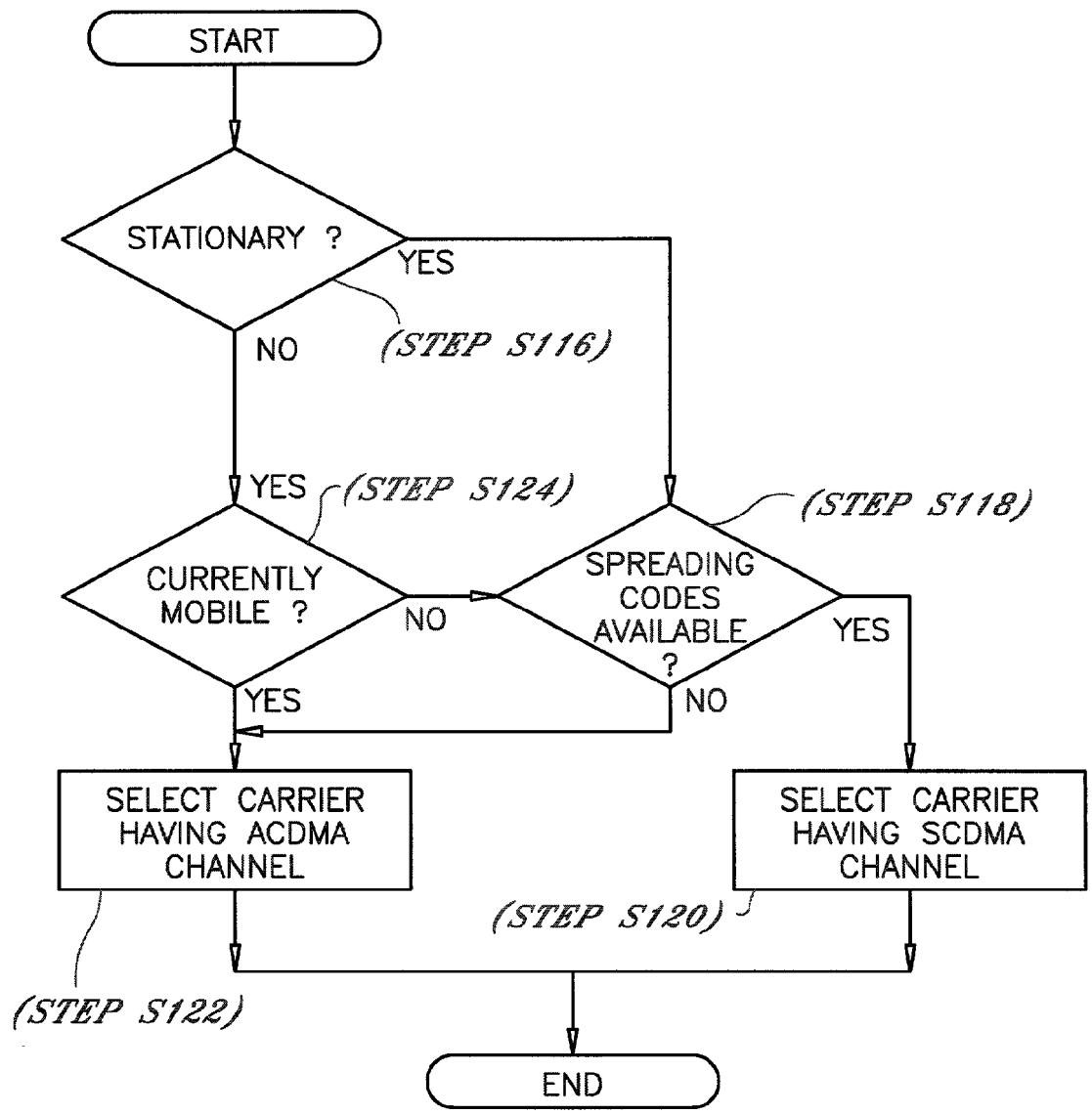
FIG. 6 is a flowchart of the new carrier selection process.

The new carrier selection process of steps S102 and S110 is described with reference to the flow chart in FIG. 6. The operational profile is evaluated to determine whether the device is stationary or moving at a velocity faster than a predetermined amount. If a device is stationary (step S116) and spreading codes are available on one or more carriers supporting SCDMA (step S118), for example orthogonal Walsh spreading codes, a carrier having an SCDMA channel is selected (step S120). Such is the case with stationary wireless devices such as wireless tower computer 12b. If no spreading codes are available, a carrier having an ACDMA channel is used (step S122).

Similarly, a carrier having an SCDMA channel is selected for a device which is generally not stationary (step S116) but which is not currently mobile (step S124) as long as spreading codes are available (step S118). A carrier having an ACDMA channel is selected if spreading codes are not available.

Devices which are categorized as currently mobile (step S124), i.e., not stationary or having a degree of mobility more than the predetermined amount, such as wireless telephone 12a and vehicular mounted wireless device 12c, use carriers having an ACDMA channel (step S122).

It is noted that the operational profile preferably indicates whether the device is stationary or mobile. It is contemplated, however, that the operational profile can indicate that a device is a nomadic device by storing a mobility history of the device. This mobility history is used to predict an initial operational characteristic of the device as stationary or mobile. As discussed above, devices which are typically stationary in use but which are suitable for mobile use are typically thought of as nomadic devices.

A device 12 using an SCDMA code can maintain soft handoff with base stations other than its primary base station 14, however, these other base stations 14 receive the SCDMA code as an ordinary pseudo-noise code generated by the combination of the orthogonal code and the "cover" scrambling code specific to each base station.

For example, device 12 associated with a base station 14 (referred to herein as base station A) as the primary link has code C1 from the SCDMA OVSF (orthogonal variable spreading factor) tree or orthogonal code set, and a scrambling code S1 associated with base station A. When device 12 enters soft handoff with another base station 14 which has its own scrambling code S2, (referred to herein as base station B), the transmission from device 12 to base station A uses an SCDMA mode while the same transmission received at base station B is experienced as just another pseudo-noise code. Thus, a device 12 in SCDMA mode can maintain soft handoff with other base stations but cannot be operating in an SCDMA mode with those base stations unless those base stations have the same scrambling code (this arrangement might be applicable for a sectored cell site). Thus, SCDMA mode devices in soft handoff will appear as interference to the SCDMA devices whose primary base station is base station B, since they are operating on the same carrier frequency.

Devices 12 in soft handoff can first be migrated to an ACDMA carrier because these devices' codes will be seen as pseudo-noise codes by the non-primary base stations and may thus become a source of interference to the in-cell (non-soft-handoff) SCDMA code users in these base stations.

The present invention advantageously provides a multi-carrier environment in which communication links, especially the reverse link, are established and maintained such that the link type selected is the optimal link for the device based on the operational profile of the device. Further, the type of communication link is changed when the operational profile changes in a manner which necessitates a change in link type, for example, a nomadic device using an SCDMA link begins moving such that ACDMA operation becomes preferable. As another example, the link may be changed when a device using an SCDMA code is in need of entering soft handoff.

The present invention provides a method for deriving the synchronization of device 12 when in soft handoff by measuring the received signal at secondary base stations 14. In the event that device 12 is handed off to one of the secondary base stations 14 (due to its pilot becoming the strongest available), the synchronization information is readily available to enable device 12 to instantaneously benefit from the use of the SCDMA code.

The present invention therefore advantageously provides a multi-carrier environment which supports both low and high mobility devices while accommodating devices whose mobility changes during use. Dividing the available bandwidth between a few subcarriers reduces the chip rate used per carrier. A lower chip rate makes it easier to establish and maintain the time alignment required for SCDMA operation. Devices which are able to effectively operate using an SCDMA carrier, i.e. low mobility devices, are isolated from the harmful effects of those devices which cannot maintain time alignment, such as high mobility devices. Recall that the strict time alignment requirements for SCDMA operation and the absence of synchronization within all secondary base stations in soft handoff reduce the benefit of SCDMA operation.

Because the present invention is preferably provided as a multi-carrier wideband system, the individual carriers can be configured and re-configured to provide the optimal carrier type distribution suitable for the system environment. For example, a 5 MHz multi-carrier system supporting three 1.25 MHz carriers can be arranged such that the ratio of SCDMA carriers to ACDMA carriers is suited to the system and its users. For example, if the system supports more stationary devices than mobile devices such as may occur in an office park, the provider of the system may allocate two carriers to SCDMA operation and one carrier to ACDMA operation. If the distribution of stationary to mobile devices changes, the provider can re-configure the system to provide more ACDMA carriers and fewer SCDMA carriers or vice-versa as necessary. In addition, the flexibility of the present invention allows the provider to optimize the carrier assignment ratio on a system-wide basis or on a per cell/section basis depending on the needs of the provider and the demand placed on the system. The present invention addresses the complementary use of SCDMA codes and conventional pseudo-noise ACDMA codes on the reverse link of wireless communications systems. As noted above, SCDMA codes differ from ACDMA codes in that SCDMA codes are orthogonal codes which are tolerant only of minor deviations in chip timing alignment, and therefore require reasonably accurate chip synchronization. When applied to the reverse link for devices distributed over the area of a cell/sector, SCDMA codes enable the minimization of intra-cell interference and therefore result in increased capacity. However, in the event that synchronization cannot be maintained within the designed tolerance, the performance of SCDMA codes degrades gracefully to that of ACDMA codes. Additionally, when it is not possible to maintain synchronization, it is advantageous to use ACDMA codes because ACDMA codes are not limited in quantity as described above with respect to SCDMA codes. In that regard, the present invention provides two access modes for use on the reverse link in which the mode best suited to the operational profile of the device is selected, thereby maximizing the benefits accruing from both the ACDMA and SCDMA access modes. The result is an increase in cell and system capacity.

In the above-described aspect of the present invention, frequency domain multiplexing (FDM) is employed to create separate communication channels for ADCMA communication and SCDMA communication. Because this arrangement employs smaller bandwidth carriers for each channel as opposed to a large single channel, the smaller bandwidth reduces the multipath resolution of the RAKE receiver in the base station.

It is desirable, however, to have a wireless communication environment which supports both SCDMA and ACDMA communication within the system and cells, but which is easier to manage than an FDM system, is more efficient than an FDM system due to elimination of the need to provide guard bands between adjacent channels and which provides a more efficient means for supporting soft handover than is implementable in an FDM system. Such a method and system are provided by another aspect of the present invention. This alternate aspect is now described.

Figure 7:
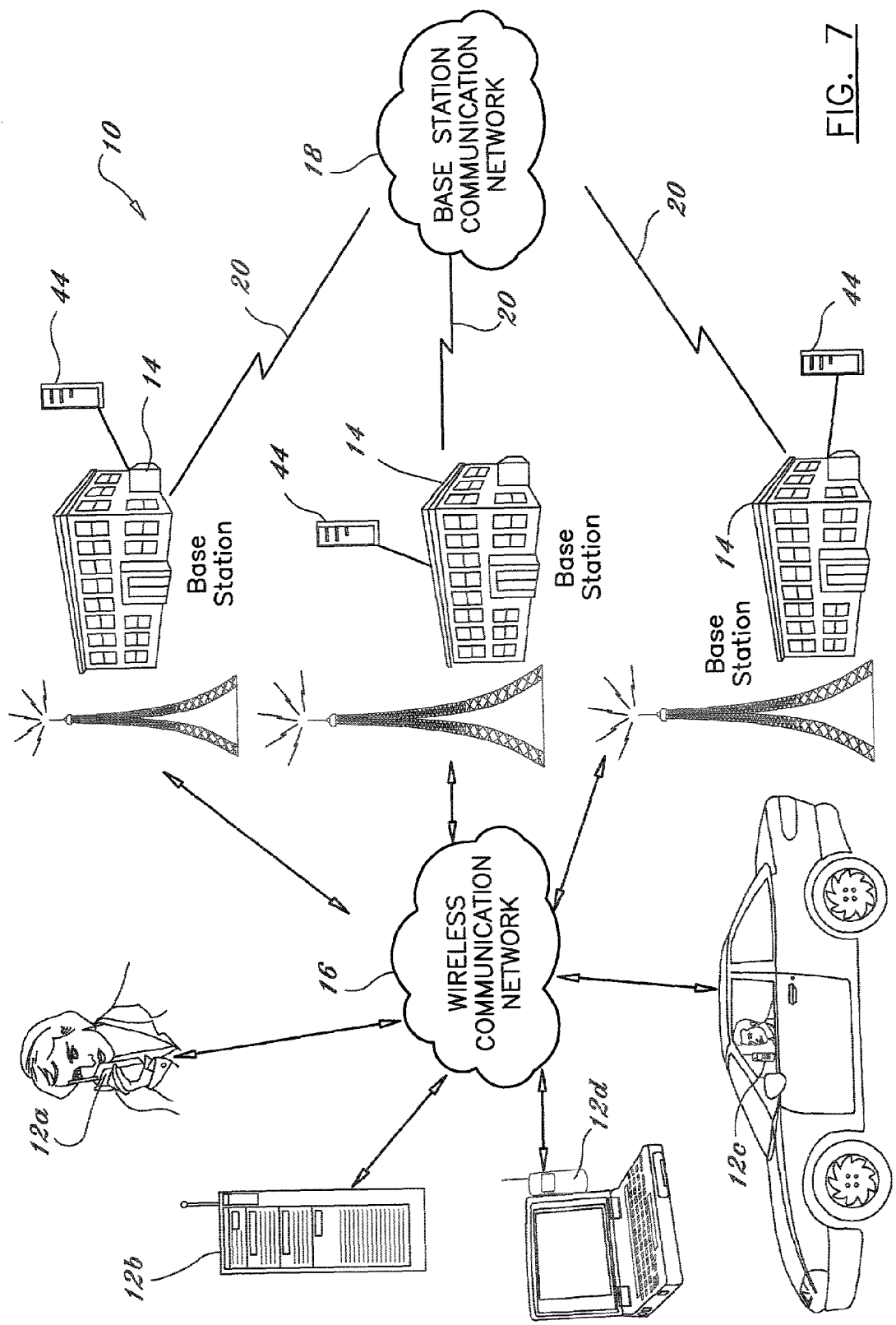
FIG. 7 is a diagram of an alternative hardware arrangement constructed in accordance with the principles of the present invention.

An example of a hardware arrangement for this alternate arrangement is shown in FIG. 7. FIG. 7 is similar to the arrangement shown in FIG. 1 with the addition of radio resource manager 44 (hereinafter referred to "RRM"). RRM 44 is shown coupled to base station 14. However, RRM 44 can be included within the physical confines of base station 14 or can be coupled to the other elements of base station 14 via a remote network connection. In other words, the physical location and placement of RRM 44 is not significant as long as the functionality provided by RRM 44 is available to a corresponding base station 14. Further, although FIG. 7 shows one RRM 44 for each base station 14, it is further contemplated that a one-to-one relationship between base stations and RRMs is not required. As such, a RRM 44 can be arranged to support one or more base stations 14.

RRM 44 is a general purpose or specialized computer arranged to execute programmatic software code to perform the below-described functions. The computational performance and memory storage capacities of RRM 44 can be suitably sized by one of ordinary skill in the art to support the expected quantity of devices 12 and base stations 14.

RRM 44 preferably includes one or more of a volatile storage device such as a random access memory, non-volatile storage device such as a read only memory and/or fixed disc for programmatic software code storage, a central processing unit to execute the programmatic software code, and an interface to couple the RRM 44 to one or more of the other components of base station 14.

In addition to the functions performed by RRM 44 which are known to those of ordinary skill in the art such as code assignment, RRM 44 arranged in accordance with the present invention includes a number of additional aspects, namely the ability to manage code reuse and the ability to manage communication channel time slots based on orthogonality and/or soft handoff operation. Each of these additional functions are described in detail below.

It should be noted that, although the code reuse and time slot management functions are described as additional functions performed by base station 44, it is contemplated that one or more of these additional functions can be implemented as part of a separate RRM 44. In other words, more than one RRM 44 can be used to support a base station 14 such that existing RRM functions can be maintained on an existing RRM 44 with the additional functions described as part of the present invention implemented by another, new RRM 44 which supports the same base station 14. In this manner, programmatic software code upgrades and equipment retrofits can be avoided. Of course, one of ordinary skill in the art would know that the described functions can be implemented as part of a new programmatic software code release and loaded into existing RRMs 44.

The code reuse feature of the present invention is described first. As discussed above, one of the benefits of orthogonal communication is the increased capacity of the communication channel. A packet-based system using SCDMA deployment in the uplink provides a 3 dB to 9 dB gain over a non-synchronous CDMA system. However, the limited number of scrambling codes available for use in an SCDMA channel adversely impacts the benefit of increased channel capacity. The present invention solves this problem.

Typically, the total spread spectrum code used in a CDMA system includes a scrambling code and a spreading code. The scrambling code is a portion of the total code common to a particular base station and is also used to identify the spreading code set(s) in use. This portion of the total code is managed and assigned by RRM 44 to each device 12 communicating with the corresponding base station 14. The spreading code is the portion of the total code assigned to a particular wireless device 12 by RRM 44 and is used to identify communications received from wireless device 12. It is the spreading code portion of the total code which is assigned as orthogonal codes to wireless device 12 communicating in a SCDMA mode, and it is these orthogonal spreading codes which are limited as discussed above. By associating multiple scrambling codes with a base station, orthogonal spreading codes can be reused in a manner which provides quasi-orthogonality, thereby increasing the SCDMA capacity within a cell in a manner which is cooperative with the time slot management feature described below.

Figure 8:
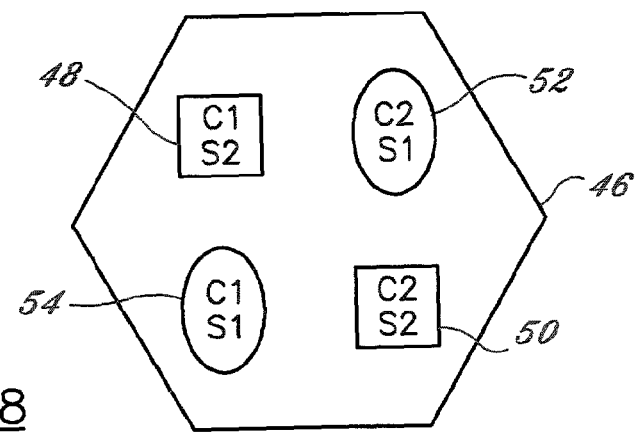
FIG. 8 is a diagram of a cell showing exemplary total code arrangements in accordance with the principles of the present invention.

An example of the multiple scrambling code assignment and management feature of the present invention is described with reference to FIG. 8. FIG. 8 shows an example of cell 46 corresponding to a base station 14 in FIG. 7. Cell 46 supports two scrambling codes identified as S1 and S2, and two spreading code sets identified as C1 and C2. As shown in FIG. 8, the arrangement of the two scrambling codes and two orthogonal spreading codes yields four separate total codes. Of course, the present invention is not limited to two scrambling codes and two spreading code sets per cell. Any quantity of each can be used depending on the capacity requirements of the cell.

In particular, total code 48 includes scrambling code S2 and orthogonal spreading code set C1; total code 50 includes scrambling code S2 and orthogonal spreading code set C2; total code 52 includes scrambling code S1 and orthogonal spreading code set C2; and total code 54 includes scrambling code S1 and orthogonal spreading code set C1. Total codes which use the same scrambling code are orthogonal to one another but not to other scrambling codes within cell 46. As such, the total codes shown within rectangles in FIG. 8 are orthogonal to one another (total codes 48 and 50) as are the total codes shown within ovals (total codes 52 and 54). However, total codes 48 and 50 are not orthogonal to total codes 52 and 54. The result is quasi-orthogonality among the total codes within cell 46.

Quasi-orthogonality allows the same orthogonal spreading code set to be reused within a cell to increase the capacity within the cell to support additional devices 12 operating in an SCDMA mode. RRM 44 further manages the communication channel by providing instruction to each wireless device 12 as to how many transmission frames device 12 may use to transmit or the duration of time device 12 may transmit using the assigned total code. By managing frame communication quantity and transmit time duration in combination with reusing spreading codes, the wireless device capacity of each cell 46 is vastly increased over known CDMA systems.

Figure 9:
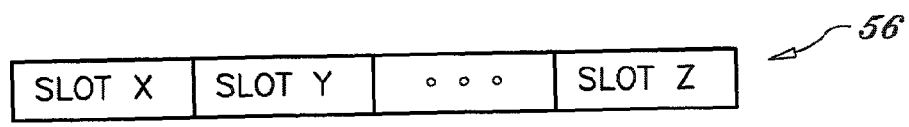
FIG. 9 is a diagram of a time slot arrangement of a communication channel.

As discussed above, total codes which use the same scrambling codes within cell 46 are orthogonal to one another. As such, by assigning these orthogonal total codes to a particular time slot, orthogonality within each time slot is preserved. FIG. 9 shows communication channel 56 divided into a plurality of time slots, namely time slots X, Y, through time slot Z. Methods for dividing a CDMA communication channel into time slots are known. RRM 44 assigns time slots for uplink communication from wireless device 12 to base station 14 within cell 46. Each time slot supports communication from one or more wireless devices 12.

Figure 10:
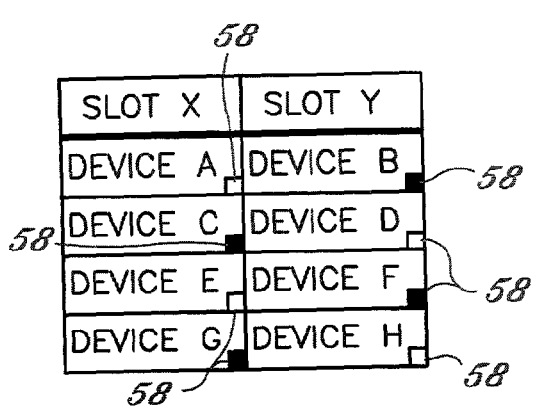
FIG. 10 is a table of an exemplary time slot assignment.

An example of time slot assignment is shown in FIG. 10. The time slot table shown in FIG. 10 includes two time slots, namely time slot Y and time slot Y. Only two time slots are described for the sake of simplicity, it being understood that a similar table can be constructed which includes all time slots for a given channel managed by RRM 44. As shown, time slot X supports devices A, C, E, and G. Time slot Y supports wireless devices B, D, F, and H. Although not necessarily the case due to factors described above such as soft handoff and multipath fading, the wireless devices assigned to each communication time slot are preferably communicating in a mode which is orthogonal to each other device 12 assigned to the same time slot. For example, devices 12 assigned a total code from total code 48 or total code 50 as shown in FIG. 8 can each be assigned to one of time slot X or time slot Y. However, for reasons described above such as multi-path fading or wireless devices in soft handoff which can only be synchronized at one base station, not all devices will be able to be assigned orthogonal spreading codes due to the need to operate using ACDMA codes. Similarly, devices 12 which were previously assigned the same time slot based on their ability to operate orthogonally may not currently be operating orthogonally.

As an example, those devices which are determined by RRM 44 not to be operating orthogonally are shown in FIG.

10 by a darkened orthogonality indicator 58. As such, it is shown by the example in FIG. 10, devices C and G in time slot X and the devices B and F in time slot Y are not operating orthogonally. The result is a degradation in the channel gain and a resultant reduction in the capacity of the channel. By monitoring the channel conditions, RRM 44 reassigns time slots to optimize channel capacity by grouping devices 12 which can benefit from the use of orthogonal codes together. An example of this regrouping is shown and described with reference to FIG. 11. Channel conditions may be monitored, for example, by determining the received signal strength of previously scheduled transmissions or from signaling channels which may be used to maintain an ongoing low data rate signaling connection between a device and a base station.

Figure 11:
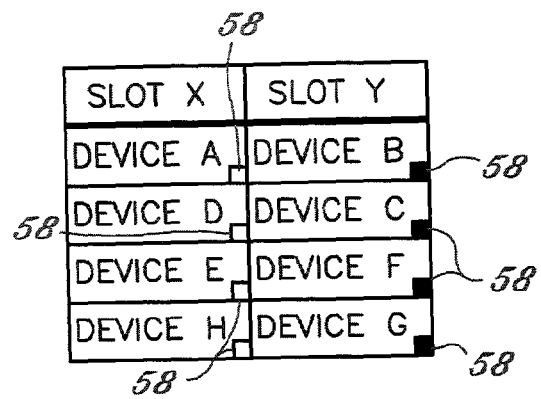
FIG. 11 is a table of an alternate exemplary time slot assignment.

As shown in FIG. 11, time slot X has been reassigned by RRM 44 to devices which can benefit from orthogonal communication such as devices which are not in soft handoff. In the example shown in FIG. 11, devices A, D, E, and H are such devices. These devices are assigned spreading and orthogonal codes from total codes which are orthogonal to one another such as those shown in FIG. 8 as total codes 48 and 50, or total codes 52 and 54. Devices which can not benefit from the use of the limited orthogonal codes are grouped together in another time slot such as time slot Y shown in FIG. 11 as including wireless devices B, C, F, and G. Wireless devices B, C, F, and G may be devices which are in soft handoff with one or more other base stations. Because a device in soft handoff can be synchronized, i.e. time-aligned to only one base station, devices in soft handoff may not be time-aligned with the other devices supported within cell 46. As such, by grouping and assigning all non-time aligned devices to a single time slot, the lack of gain observed in time slot Y is offset by the gain provided by grouping the orthogonal devices in time slot X.

Figure 12:
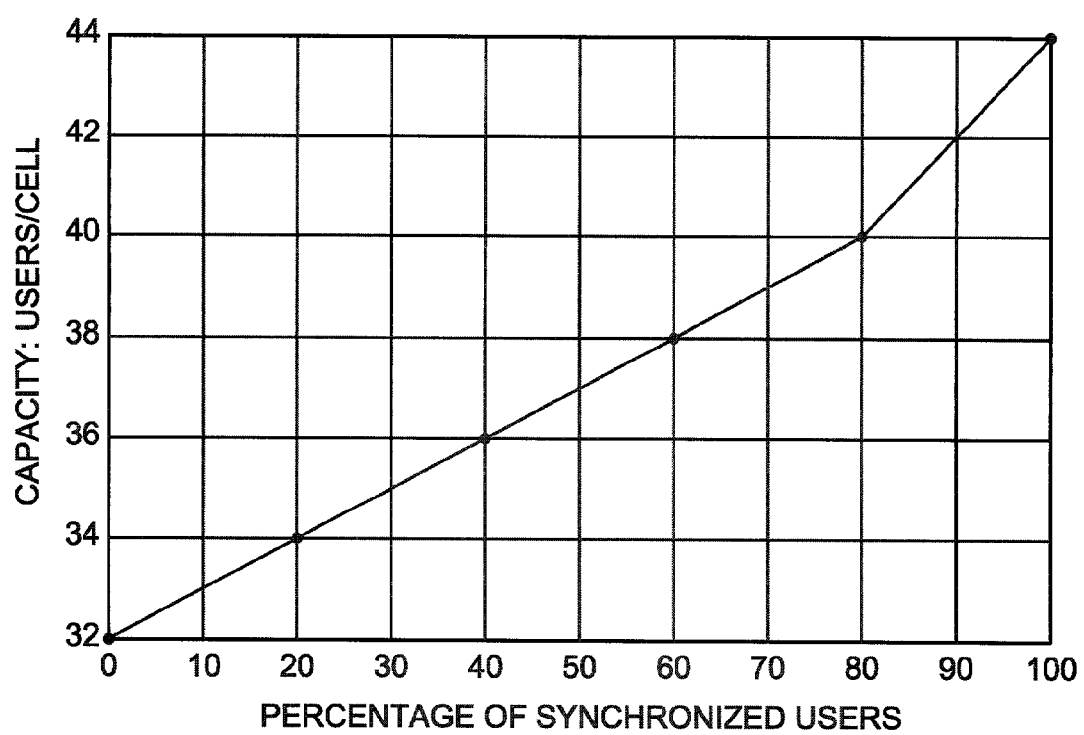
FIG. 12 is a graph of a sample performance evaluation for an exemplary test case.

FIG. 12 shows a sample performance evaluation for an exemplary test case where the maximum number of users per cell (capacity) is plotted as a function of the percentage of synchronized (SCDMA) users. When all users are in ACDMA mode (no synchronization), 32 users can be accommodated. Conversely, when all users are in SCDMA mode, the cell capacity is 44 users (a capacity increase of 38% over the ACDMA case). A situation with partial orthogonality such as shown in FIG. 10 could be represented by a scenario where 50% of the users are ACDMA and 50% are SCDMA. In such a situation, cell capacity is 37 users, and this can be increased to 44 users (a capacity increase of 19% over the partial orthogonality case) by reorganizing the time slot assignment to ensure that all of the synchronized SCDMA users are grouped together into the same time slot. It should be noted that test results are only for an exemplary test case, and capacity gains for other scenarios may be greater or less than the numbers given here.

By managing code reuse and/or time slot assignments in the above-described manner, separation of wireless devices using SCDMA codes versus ACDMA codes is simpler than the method required to provide the same separation using FDM. The present invention advantageously provides RRM functions which, based in part on factors such as channel conditions and soft handoff requirements, expand the number of orthogonal codes available within cell 46. This is accomplished by reusing the codes to achieve a quasi-orthogonal environment and by assigning time slots in a manner which groups SCDMA communicating devices within one or more time slots to increase capacity within those time slots (a 10 dB gain within a time slot equates to approximately an 8× capacity increase) as compared with time slots which are not assigned based on the ability to benefit from orthogonal (SCDMA) codes.

The present invention provides these advantages without adding complexity to system design because packet based systems typically have a RRM 44 to assign resources to the wireless devices. As such, the present invention advantageously provides an arrangement under which existing RRMs 44 take into consideration the performance characteristics of device 12 such as the operational profile described above, adverse channel conditions, i.e. multipath fading, and soft handover operation when determining the assignment of SCDMA or ACDMA codes, and the assignment of transmission time slots and transmission duration based on the assigned codes.

The present invention also advantageously provides a method which allows the use of a single large bandwidth carrier to support ACDMA and SCDMA codes, thereby avoiding the need to support multiple carriers with guard bands there between.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A method of assigning a time slot for wireless communication between a device and a base station, comprising:
   determining which one of an ACDMA channel and an SCDMA channel to use for communication based on a determined one or more performance characteristics corresponding to the device;
   assigning a spreading code corresponding to the determined one of the ACDMA channel and SCDMA channel based on the determined one or more performance characteristics; and
   assigning a time slot corresponding to the determined one of the ACDMA channel and SCDMA channel for communication with the base station based on the determined one or more performance characteristics corresponding to the device.

2. The method according to claim 1, wherein the at least one performance characteristic corresponds to soft handoff operation.

3. The method according to claim 1, further comprising reassigning at least one of the spreading code and the time slot assigned to the device based on a change in a performance characteristic of the device.

4. A method of assigning a time slot for wireless communication between a device and a base station, comprising:
   determining one or more performance characteristics corresponding to the device;
   assigning a spreading code based on the determined one or more performance characteristics;
   assigning a time slot for communication with the base station based on the assigned spreading code;
   assigning a scrambling code, the scrambling code identifying the base station and identifying a spreading code set corresponding to the spreading code; and
   assigning a total code, the total code being comprised of the assigned spreading code and the assigned scrambling code.

5. The method according to claim 4, wherein the base station has a plurality of scrambling codes corresponding thereto, the assigned scrambling code being selected from the plurality of scrambling codes.

6. The method according to claim 5, wherein the base station has a plurality of spreading code sets corresponding thereto, the assigned spreading code being selected from one of the plurality of spreading code sets.

7. The method according to claim 6, wherein a first combination of a first spreading code set with a scrambling code yields total codes which are orthogonal to a second combination of a second spreading code set with the scrambling code.

8. An apparatus for assigning a time slot for wireless communication between a device and a base station, the apparatus comprising:
a central processing unit, the central processing unit operating to:
determine which one of an ACDMA channel and an SCDMA channel to use for communication based on a determined one or more performance characteristics corresponding to the device;
assign a spreading code corresponding to the determined one of the ACDMA channel and SCDMA channel based on the determined one or more performance characteristics; and
assign a time slot corresponding to the determined one of the ACDMA channel and SCDMA channel for communication with the base station based on the determined one or more performance characteristics corresponding to the device.

9. The apparatus according to claim 8, further comprising a communication interface, the communication interface in operative communication with the central processing unit and facilitating communication with the base station, wherein the central processing unit provides the assigned time slot to the base station for transmission to the device.

10. The apparatus according to claim 8, wherein the at least one performance characteristic corresponds to soft handoff operation.

11. The apparatus according to claim 8, further comprising reassigning at least one of the spreading code and the time slot assigned to the device based on a change in a performance characteristic of the device.

12. An apparatus for assigning a time slot for wireless communication between a device and a base station, the apparatus comprising:
a central processing unit, the central processing unit operating to:
determine one or more performance characteristics corresponding to the device;
assign a spreading code based on the determined one or more performance characteristics;
assign a time slot for communication with the base station based on the assigned spreading code;
assign a scrambling code, the scrambling code identifying the base station and identifying a spreading code set corresponding to the spreading code; and
assign a total code, the total code being comprised of the assigned spreading code and the assigned scrambling code.

13. The apparatus according to claim 12, wherein the base station has a plurality of scrambling codes corresponding thereto, the central processing unit further operating to assign the scrambling code from the plurality of scrambling codes.

14. The apparatus according to claim 13, wherein the base station has a plurality of spreading code sets corresponding thereto, the central processing unit further operating to assign the spreading code from one of the plurality of spreading code sets.

15. The apparatus according to claim 14, wherein a first combination of a first spreading code set with a scrambling code yields total codes which are orthogonal to a second combination of a second spreading code set with the scrambling code.

16. A method of selecting spreading code sets associated with code division multiple access wireless communication between a device and a base station, the method comprising:
selecting a scrambling code being from a plurality of scrambling codes corresponding to the base station; and
selecting a code division multiple access spreading code set from a plurality of code division multiple access spreading code sets corresponding to the base station,
wherein a first combination of a first spreading code set with a scrambling code yields total codes which are orthogonal to a second combination of a second spreading code set with the scrambling code.

17. The method according to claim 16, wherein the code division multiple access spreading code is a synchronous code division multiple access spreading code.

* * * * *